United States Patent

Ruell et al.

[11] 3,905,674

[45] Sept. 16, 1975

[54] APPARATUS FOR PRODUCING ONE-DIMENSIONAL HOLOGRAMS

[75] Inventors: Hartwig Ruell, Otterfing; Eckhard Storck, Munich, both of Germany

[73] Assignee: Siemens Aktiengesellschaft, Berlin & Munich, Germany

[22] Filed: July 11, 1974

[21] Appl. No.: 487,550

[30] Foreign Application Priority Data

July 11, 1973 Germany ........................... 2335305

[52] U.S. Cl. ....... 350/3.5; 178/6.7 A; 179/100.3 G; 346/108

[51] Int. Cl.² ........................................ G03H 1/04

[58] Field of Search ..................... 350/3.5, 162 SF; 340/173 LT; 179/100.3 G; 346/108; 178/6, 7 R, 7 A

[56] References Cited

UNITED STATES PATENTS 3,770,886 11/1973 Kiemle ............................... 350/3.5

3,809,453 5/1974 Ruell et al. ......................... 350/3.5

*Primary Examiner*—Ronald J. Stern

*Attorney, Agent, or Firm*—Hill, Gross, Simpson, Van Santen, Steadman, Chiara & Simpson

[57] ABSTRACT

An apparatus for sequentially recording extremely narrow, one-dimensional holograms on a moving storage tape by directing an object wave and a source symmetrical reference wave from a coherent light source onto the moving storage tape characterized by a spherical lens and a plane-parallel transparent plate disposed in the path of each of the two beams with the plate being positioned between the storage medium and its respective lens at an angle of inclination to the axis of its respective beam. Each lens focuses its respective beam in a sharply defined focal spot which is spread out by the plate to form a narrow focal line extending perpendicular to the direction of propagation of the wave.

3 Claims, 1 Drawing Figure

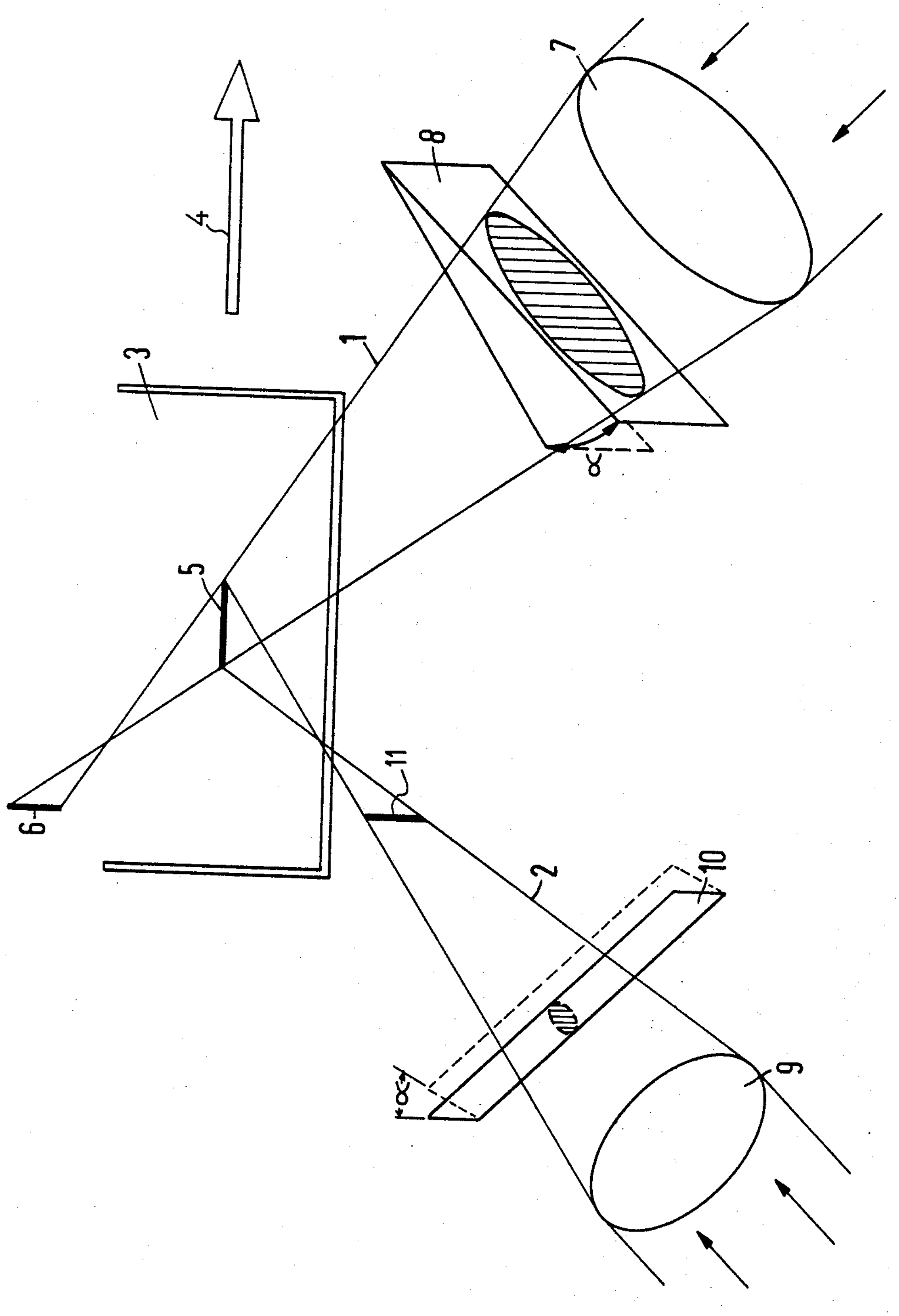
1
2
3
4
5
6
7
8
9
10
11
α

APPARATUS FOR PRODUCING ONE-DIMENSIONAL HOLOGRAMS

BACKGROUND OF THE INVENTION

1. Field of the Invention

The present invention is directed to an apparatus for recording extremely narrow, one-dimensional holograms on a moving storage medium by directing an object wave beam and a source symmetrical reference wave both produced from a coherent light source onto a moving storage medium.

2. Prior Art

In a sequential holographic data storage, electrical signals are generally modulated by pulse modulation onto a laser beam and then recorded on a storage medium in the form of superimposed one-dimensional or mono-dimensional holograms.

The storage of information contained in the form of electrical signals on a photosensitive storage medium, for example, a photosensitive tape, is well known. A soundtrack film is an example. In a soundtrack film, speech and music signals are employed to intensity modulate a light source which is projected on a moving film. The information contained in the speech and music signals is recorded on the moving film in the form of density variations. It is also known to employ photographic film material to record video signals and thus to record television broadcasts.

In known methods of reproducing holographically stored data, the storage medium is transported past a reference light source and the image points which are reconstructed are projected on a detector which generates an alternating current which corresponds to the original signal. One method of holographically recording information which occurs in the form of electrical signals has been proposed in our earlier U.S. Pat. No. 3,809,453. In this method, a coherent object wave pulse modulated by the electrical signal which is to be recorded and a coherent reference wave are superimposed upon a moving photosensitive storage medium in such a fashion that one-dimensional or mono-dimensional holograms are produced.

To produce mono-dimensional holograms, a plurality of cylindrical lenses were used with their axis extending perpendicular to one another. In order to achieve the highest possible storage density, at least the object wave must produce an extremely sharply focused focal line. It is an extremely difficult procedure to manufacture cylindrical lenses with a large aperture ratio for producing refraction limited focal lines with a line width in the order of the wave length of the laser light employed in the recording apparatus. If an unnecessarily large line width is produced by the lenses, a wider track on the recording medium is required and this results in a reduction in the attainable storage density.

SUMMARY OF THE INVENTION

The present invention is directed to providing a simple apparatus for production of one-dimensional holograms having extremely narrow line widths so that particularly narrow tracks can be produced on the storage medium and therefore an optimum use is made of the available capacity of the storage medium. To accomplish this task, the present invention is directed to an improvement in an apparatus which utilizes a coherent light source from which an object wave and a source symmetrical reference wave are directed onto the moving storage medium with the improvement comprising a spherical lens and a plane-parallel transparent plate being disposed in the path of each of the two beams with the plate being positioned between the storage medium and its respective lens at an angle of inclination to the axis of its respective beam so that each beam is focused by its lens and the plate spreads the focused beam into a narrow focal line.

BRIEF DESCRIPTION OF THE DRAWING

The FIGURE schematically illustrates the improvement in accordance with the present invention in an apparatus for recording one-dimensional holograms on a storage medium.

DESCRIPTION OF THE PREFERRED EMBODIMENT

The principles of the present invention are particularly useful in an apparatus for sequentially recording extremely narrow, one-dimensional holograms on a moving storage medium or tape 3 illustrated in the figure. The apparatus includes a coherent light source such as a laser which is not illustrated and produces a coherent object wave beam 1 and a coherent reference wave beam 2. The object wave beam 1 is modulated by conventional means (not illustrated) with the information to be recorded and is directed along with the reference wave beam 2 at the storage medium 3 which is moving in a direction of an arrow 4 to record a narrow, overlapping, one-dimensional hologram 5 thereon.

In accordance with the present invention, the beam of the object wave 1 is focused by a spherical lens 7 and directed through a plane-parallel flat transparent plate 8 prior to being projected onto the storage medium 3. In a similar manner, the reference wave beam 2 is focused by a spherical lens 9 and projected through a plane-parallel flat transparent plate 10 prior to being projected onto the storage medium.

Without the presence of the plates 8 and 10, each of the lenses 7 and 9 would focus their respective beams 1 and 2 into sharply defined spots on the storage medium 3. By the positioning of the plates 8 and 10 in the respective paths of the beams 1 and 2 and by positioning these plates at an angle inclined relative to the beam direction or axis, the symmetry of the ideal spherical wave emanating from the spherical lenses 7 and 9 is disturbed. These plates thus act like spatial phase modulators which introduce a reproduction error, primarily astigmatism, in the waves. Because of this astigmatism, the focal spots of the spherical lenses are spread out into the form of narrow focal lines extending perpendicularly to the direction of propagation of the waves. The vertical focal lines are disposed symmetrically vis-a-vis the storage medium. The object wave as well as the reference wave form two focal lines 5, 6 and 11, 5 which are perpendicular to one another and are spaced apart by an interval in the order of some few hundred microns.

The plane-parallel plates 8 and 10 may be simple glass plates with a thickness of 0.1 to 3 mm and preferably a thickness of 1.5 mm. Good results have been obtained with spherical lenses whose aperture ratio were 1:4.5. The angle $\alpha$ of inclination of the two plane-parallel plates 8 and 9 relative to the direction of propagation of the waves may be in a range of 10° to 50° and preferably is approximately 30° to the axis of their respective beams.

The focal lines 5, 6 and 11, 5, which are produced by the plates 8 and 10, are perpendicular to one another and are both diffraction-limited. This is a great advantage in that the half-value width of the focal spot, as produced by the spherical lenses 7 and 9 alone, is not affected by the presence of the plane-parallel plates 8 and 10 so that narrow, sharply defined focal lines 5, 6 and 11, 5 are produced.

On the storage or recording medium, the reference wave must be just as narrow as the object wave in order that the resultant track on the recording medium 3 is kept narrow and at the same time in a source-symmetrical relationship to the object wave. To precisely adjust the lens 9 and the plane-parallel plate 10, the following procedure can be adopted. The storage medium 3 is replaced by a reflector from which the object wave 1 will be reflected. The plate 10 and the lens 9 are then adjusted so that the lens 9 produces an ideal plane wave. Thereafter, the reflector is replaced by the storage plate 3 so that the arrangement is ready to record the one-dimensional or mono-dimensional holograms 5 on the storage medium which may be in a tape form.

Depending upon the aperture ratio of the spherical lenses and the angle of inclination of the plates, the recorded one-dimensional holograms will have a width of 3 to 4 microns, a length of 50 microns and overlap each other so that a fresh hologram was recorded at an interval of a few microns. To reconstruct these holograms or retrieve the information therefrom, the reference wave must be replaced by a reconstruction wave of the same geometry. In reconstructing the one-dimensional holograms 5, the images 6, which are perpendicular to these holograms, are produced and can be either transformed into the form of light spots or read out by an elongated light detector.

A further advantage of the present invention resides in the fact that the positioning of the plane-parallel flat plates 8 and 9 which may be optical flats along the optical axis is uncritical. The plates can be arbitrarily displaced from one position to a second position between the lens and data carrier, which second position is parallel to the one position, without in any way altering the production of the sharply defined narrow focal lines.

To ensure that the focal lines and therefore the one-dimensional holograms 5 are disposed precisely in the direction of transfer or movement of the tape, it is advantageous to dispose the plane-parallel flat plates in such a fashion that they are pivotable about two axes which are perpendicular to one another.

The thickness of the plates is not fundamentally critical but should be chosen together with the refractive index and the angle of tilt or angle of inclination of the plates and in accordance with the aperture ratio of the spherical lenses. The thickness should not exceed an upper limiting value because otherwise the desired astigmatism will have other reproduction errors such as coma and spherical aberrations superimposed upon it. The length of the focal line and therefore the one-dimensional holograms can be determined quite simply by the plate thickness and by the angle of inclination of the plate to the beam axis.

Although various minor modifications may be suggested by those versed in the art, it should be understood that we wish to employ within the scope of the patent granted hereon, all such modifications as reasonably and properly come within the scope of our contribution to the art.

We claim:

1. In an apparatus for sequentially recording extremely narrow, one-dimensional holograms on a moving storage medium, the apparatus including a coherent light source from which an object wave and a source symmetrical reference wave are directed onto the moving storage medium, the improvement comprising a spherical lens and a plane-parallel transparent plate disposed in the path of each of the two beams with the plate being positioned between the storage medium and its respective lens at an angle of inclination to the axis of its respective beam so that each of the beams is focused by its lens and the plate spreads the focused beam into a narrow focal line.

2. In an arrangement according to claim 1, wherein the angle of inclination to the beam axis is in a range of 10° to 50°.

3. In an arrangement according to claim 2, wherein the angle of inclination is 30°.

* * * * *